(12) United States Patent
Lee et al.

(10) Patent No.: US 7,511,456 B2
(45) Date of Patent: Mar. 31, 2009

(54) MIDDLE OR LARGE-SIZED BATTERY PACK HAVING A PLURALITY OF BATTERY CELLS IN A COMPACT STRUCTURE

(75) Inventors: HanHo Lee, Daejeon (KR); Youngjoon Shin, Daejeon (KR); Jeeho Kim, Daejeon (KR); Jin Woong Ha, Cheonan-si (KR); JaeSeong Yeo, Daejeon (KR); Minchul Jang, Daejeon (KR)

(73) Assignee: LG Chem, Ltd. (KR)

( * ) Notice: Subject to any disclaimer, the term of this patent is extended or adjusted under 35 U.S.C. 154(b) by 134 days.

(21) Appl. No.: 11/415,916

(22) Filed: May 2, 2006

(65) Prior Publication Data

US 2006/0267545 A1 Nov. 30, 2006

(30) Foreign Application Priority Data

May 2, 2005 (KR) ............ 10-2005-0036717
May 10, 2005 (KR) ............ 10-2005-0038686

(51) Int. Cl.
H02J 7/00 (2006.01)
(52) U.S. Cl. .............. 320/116; 320/124; 320/134; 320/135; 320/150
(58) Field of Classification Search ............ 320/120, 320/134, 116, 119, 117, 124, 126, 136, 150; 361/65; 429/9, 97, 129
See application file for complete search history.

(56) References Cited

U.S. PATENT DOCUMENTS

| | | | |
|---|---|---|---|
| 5,572,110 A * | 11/1996 | Dunstan ............ | 320/106 |
| 6,534,213 B1 * | 3/2003 | Tanaka et al. ............ | 429/100 |
| 6,608,468 B2 * | 8/2003 | Nagase ............ | 320/132 |
| 6,833,215 B2 * | 12/2004 | Anglin et al. ............ | 429/179 |
| 2002/0043959 A1 * | 4/2002 | Tanaka et al. ............ | 320/116 |
| 2003/0076072 A1 * | 4/2003 | Tojo et al. ............ | 320/134 |
| 2003/0118898 A1 * | 6/2003 | Kimura et al. ............ | 429/156 |
| 2003/0222618 A1 * | 12/2003 | Kanouda et al. ............ | 320/116 |
| 2003/0235722 A1 * | 12/2003 | Blanckaert et al. ............ | 429/9 |
| 2004/0070366 A1 * | 4/2004 | Takeshita et al. ............ | 320/107 |
| 2004/0211053 A1 * | 10/2004 | Trainer et al. ............ | 29/623.1 |
| 2005/0077878 A1 * | 4/2005 | Carrier et al. ............ | 320/134 |
| 2007/0243462 A1 * | 10/2007 | Nagatani et al. ............ | 429/185 |

FOREIGN PATENT DOCUMENTS

| KR | 1020060047061 | 5/2006 |
|---|---|---|
| KR | 1020060073383 | 6/2006 |

* cited by examiner

*Primary Examiner*—Akm E Ullah
*Assistant Examiner*—Arun Williams
(74) *Attorney, Agent, or Firm*—Cantor Colburn LLP

(57) ABSTRACT

Disclosed herein is a middle- or large-sized battery pack having a plurality of battery cells, which can be charged and discharged, stacked one on another with high density and electrically connected with each other. When the battery cells swell due to abnormal operation of the battery pack or degradation of the battery pack caused by the charge and discharge of the battery cells for a long period of time, stress is concentrated on a predetermined region of the battery pack due to the change of thickness of the swelling battery cells, whereby the physical change of the battery pack is caused, and the disconnection of an electrically connecting member of the battery pack is mechanically accomplished by the physical change of the battery pack. Consequently, the battery pack according to the present invention provides high safety.

8 Claims, 12 Drawing Sheets

MIDDLE OR LARGE-SIZED BATTERY PACK HAVING A PLURALITY OF BATTERY CELLS IN A COMPACT STRUCTURE

FIELD OF THE INVENTION

The present invention relates to an improved middle- or large-sized battery pack having increased safety, and, more particularly, to a middle- or large-sized battery pack having an overall compact structure and constructed such that, when battery cells swell due to various causes, physical change, such as deformation, breakage, or separation, at a predetermined region of the battery pack is caused, and therefore, the disconnection of an electrically connecting member is mechanically accomplished, whereby the safety of the battery pack is guaranteed.

BACKGROUND OF THE INVENTION

As mobile devices have been increasingly developed, and the demand of such mobile devices has increased, the demand of secondary batteries has also sharply increased as an energy source for the mobile devices. One of the secondary batteries is a lithium secondary battery having high energy density and discharge voltage, on which much research has been carried out and which is now commercially and widely used.

The secondary battery has attracted considerable attention as a power source for power-driven devices, such as electric bicycles (E-bikes), electric motorcycles, electric vehicles (EV), or hybrid electric vehicles (HEV), as well as a power source for mobile wireless electronic devices, such as mobile phones, digital cameras, personal digital assistants (PDAs), and laptop computers.

A small-sized battery pack having a battery cell packed therein is used for small-sized devices, such as mobile phones and digital cameras. On the other hand, a middle- or large-sized battery pack having battery modules, which includes two or more battery cells connected in parallel and/or in series with each other, packed therein is used for middle- or large-sized devices, such as laptop computers and electric vehicles.

As described above, the lithium secondary battery has excellent electrical properties; however, the lithium secondary battery has low safety. For example, when abnormal operations, such as overcharge, overdischarge, exposure to high temperature, and electrical disconnection, of the lithium secondary battery occur, decomposition of an active material and an electrolyte, which are components of the battery, is caused, whereby heat and gas are generated, and the high-temperature and high-pressure condition caused by the generation of the heat and the gas accelerates the above-mentioned decomposition. Eventually, fire or explosion may occur.

For this reason, the lithium secondary battery is provided with a safety system, such as a protection circuit for interrupting electric current during overcharge, overdischarge, or overcurrent of the battery, a positive temperature coefficient (PTC) element whose resistance is greatly increased so as to interrupt electric current when the temperature of the battery is increased, and a safety vent for interrupting electric current or discharging gas when pressure is increased due to the generation of the gas. In the case of a small-sized cylindrical secondary battery, for example, the PTC element and the safety vent are generally disposed at the upper part of an electrode assembly (a generating element) having a cathode/separator/anode structure, which is mounted in a cylindrical case. In the case of a rectangular or pouch-shaped small-sized secondary battery, on the other hand, the protection circuit module and the PTC element are generally mounted at the upper end of a rectangular case or a pouch-shaped case, in which the generating element is mounted in a sealed state.

The safety problem of the lithium secondary battery is even more serious for a middle- or large-sized battery pack having a multi-cell structure. Since a plurality of battery cells are used in the multi-cell structure battery pack, the abnormal operation of some of the battery cells may cause the abnormal operation of the other battery cells, whereby fire or explosion may occur, which may lead to a large-scale accident. For this reason, the middle- or large-sized battery pack is provided with a safety system, such as a fuse, a bimetal, and a battery management system (BMS), for protecting the battery cells from the overcharge, the overdischarge, and the overcurrent.

However, as the lithium secondary battery is continuously used, i.e., as the battery is continuously charged and discharged, the generating element and the electrically connecting member are gradually degraded. For example, the degradation of the generating element leads to the decomposition of the electrode material and the electrolyte, by which gas is generated. As a result, the battery cell (the cylindrical case or the pouch-shaped case) gradually swells. In the normal state of the lithium secondary battery, the safety system, i.e., the BMS detects the overdischarge, the overcharge, and the overcurrent, and controls/protects the battery pack. In the abnormal state of the lithium secondary battery, however, when the BMS is not operated, a possibility of danger is increased, and it is difficult to control the battery pack for the safety of the battery pack. The middle- or large-sized battery pack has a structure in which a plurality of battery cells is fixedly mounted in a predetermined case. As a result, the respective swelling battery cells are further pressurized in the restrictive case, and therefore, a possibility of fire or explosion is greatly increased under the abnormal operation condition of the battery pack.

Consequently, a technology for fundamentally guaranteeing the safety of the middle- or large-sized battery pack is seriously needed.

In addition, as the size and the weight of the device have been reduced, the demand of a compact-structure battery pack has also increased.

SUMMARY OF THE INVENTION

Therefore, the present invention has been made to solve the above-mentioned problems, and other technical problems that have yet to be resolved.

Specifically, it is an object of the present invention to provide a battery pack wherein the disconnection of an electrically connecting member of the battery pack is mechanically accomplished by the physical change of the battery pack caused when battery cells swell due to abnormal operation, such as overcharge, overdischarge, or overcurrent, of the battery pack or degradation of the battery pack caused by the charge and discharge of the battery cells for a long period of time, thereby guaranteeing the safety of the battery pack.

It is another object of the present invention to provide a middle- or large-sized battery pack constructed in a compact structure while guaranteeing the safety of the battery pack.

In accordance with the present invention, the above and other objects can be accomplished by the provision of a middle- or large-sized battery pack having a plurality of battery cells, which can be charged and discharged, stacked one on another with high density and electrically connected with each other, wherein, when the battery cells swell due to abnormal operation of the battery pack or degradation of the battery pack caused by the charge and discharge of the battery cells for a long period of time, stress is concentrated on a predetermined region of the battery pack due to the change of thickness of the swelling battery cells, whereby the physical change of the battery pack is caused, and the disconnection of an electrically connecting member of the battery pack is mechanically accomplished by the physical change of the battery pack.

A preferable example of the middle- or large-sized battery pack in which the battery cells are stacked one on another with high density on a plate while the battery cells are electrically connected with each other is disclosed in Korean Patent Application No. 2004-112589, which has been filed in the name of the applicant of the present patent application. The disclosure of the above-mentioned Korean patent application is hereby incorporated by reference as if fully set forth herein.

In a preferred embodiment, the middle- or large-sized battery pack comprises: a lower case having an upper receiving part, in which the plurality of battery cells are successively stacked one on another as unit cells; an upper case having a lower receiving part, which covers the upper end of the unit cells stacked on the lower case; a first circuit unit for electrically connecting the stacked unit cells with each other, the first circuit unit having a sensing board assembly for detecting the voltage, the current, and/or the temperature of the battery; a second circuit unit electrically connected to the first circuit unit, the second circuit unit having a main board assembly for controlling the overall operation of the battery pack; and a third circuit unit electrically connected to the second circuit unit, the third circuit unit being connected to an external output terminal while preventing overcharge, overdischarge, and/or overcurrent.

The first circuit unit includes connecting terminals for connecting the unit cells in parallel or in series with each other and a sensing board assembly for detecting voltage and/or current signals from the respective unit cells. Preferably, the first circuit unit receives the voltage signal of the unit cells. The temperatures of the unit cells may be measured, as the overall temperature of the battery, by the sensing board assembly or the main board assembly. Preferably, the first circuit unit is located at the front of the battery pack in the displacement direction of electrode terminals of the unit cells.

The second circuit unit may be located along with the first circuit unit in the displacement direction of electrode terminals of the unit cells, or may be mounted in a lower receiving part of the lower case. Alternatively, the second circuit unit may be located at the rear of the battery pack, which is opposite to the first circuit unit. Preferably, the second circuit unit is mounted in a lower receiving part of the lower case. In this case, the unit cells are electrically connected to the second circuit unit mounted in the lower receiving part of the lower case via the first circuit unit, and the operation of the battery is controlled by the main board assembly of the second circuit unit.

The third circuit unit, i.e., the last element of the battery pack which is connected to an external device while controlling the overcharge, the overdischarge, and the overcurrent during the charge and the discharge of the battery, may also be located along with the first circuit unit in the displacement direction of electrode terminals of the unit cells, or may be mounted in a lower receiving part of the lower case. Alternatively, the third circuit unit may be located at the rear of the battery pack, which is opposite to the first circuit unit. Preferably, the third circuit unit is located at the rear of the battery pack, which is opposite to the first circuit unit. Preferably, the control of the overcurrent during the charge and the discharge of the battery is performed by a switching element, such as field effect transistor (FET), included in the third circuit unit.

The above-described circuit units are formed in the shape of a printed circuit board (PCB), which accomplishes the compact structure and the stability of the battery pack. According to circumstances, some of the circuit units may be integrally formed as a single body.

Since the upper case and the lower case of the battery pack are separated from each other, it is possible to add or remove the unit cells between the upper case and the lower case depending upon desired electrical capacity and output of the battery pack, and therefore, it is possible to flexibly design the battery pack. Also, the overall size of the upper case and the lower case corresponds to the size of the respective unit cells. Consequently, it is possible to manufacture the battery pack in a compact structure.

In the battery pack having the battery cells stacked one on another according to the present invention, when the battery cells swell due to various causes, stress is generated in the thickness direction of the battery cells. The stress is applied to the battery pack in the thickness direction of the battery cells. In the battery pack constructed such that the battery pack is not structurally deformed in spite of the internal change of the battery pack, the stress is directly concentrated on the battery cells. As a result, the above-described possibility of danger is increased. On the other hand, the present invention is characterized in that the stress is concentrated on a part (a predetermined region) of the battery pack, and therefore, the physical change at the predetermined region of the battery pack occurs. The predetermined region of the battery pack may be deformed, separated, or broken due to the physical change of the battery pack. Also, the present invention is characterized in that the disconnection of the electrically connecting member is mechanically accomplished when the physical change of the battery pack occurs.

Consequently, when the battery pack according to the present invention is constructed such that the predetermined region of the battery pack can be easily deformed, separated, or broken when the battery cells swell, and therefore, the thickness of the battery cells exceeds a critical value, and when the battery pack according to the present invention is constructed such that the disconnection of the electrically connecting member is mechanically accomplished with ease when the physical change of the battery pack occurs, the safety of the battery pack is guaranteed.

Preferably, the predetermined region of the battery pack, which is physically changed due to the swelling of the battery cells, may be the front, the rear, and/or the side of the battery pack at which the battery cells are stacked one on another. Consequently, it is possible to construct the battery pack such that the mechanical strength of the predetermined region at the front, the rear, or the side of the battery pack is relatively decreased, and therefore, stress is concentrated on the predetermined region having low mechanical strength when the battery cells swell, whereby the battery pack is physically changed. Preferably, the predetermined region may be a coupling region of a member constituting the battery pack or the member itself.

In the above-described battery pack structure according to the preferred embodiment, when a printed circuit board (PCB) of the third circuit unit (a third circuit unit PCB) is located at the side or the rear of the battery pack, the part physically changed due to the swelling of the battery cells may be a coupling region at which the upper case and/or the lower case and the third circuit unit PCB are coupled with each other.

The coupling between the respective members constituting the battery pack may be accomplished in various manners. For example, the coupling may be accomplished by forming coupling grooves at the corresponding members and inserting a bolt through the coupling grooves. Consequently, the coupling region is constructed such that stress is concentrated on the predetermined region having low mechanical strength when the battery cells swell, whereby the battery pack is physically changed, for example, such that the mechanical strength of the coupling region is less than those of the other coupling regions, and therefore, the predetermined region of the battery pack can be deformed, separated, or broken due to the concentrated stress. In a preferred embodiment, the coupling groove of one of the members at the coupling region may be formed in the shape of an open groove.

The battery pack includes members (electrically connecting members), such as a bus bar, a wire, and a cable, for electrically connecting a plurality of components with each other. According to the present invention, the battery pack is constructed such that the disconnection of the electrically connecting member is mechanically accomplished when the above-described physical change of the battery pack occurs. Specifically, the connection region of the electrically connecting member is broken or separated at the predetermined region where the stress is concentrated when the battery cells swell, whereby the electric connection is broken.

The connection region of the electrically connecting member, which is broken or separated, may be constructed in various manners. For example, the connection region of the electrically connecting member may be a connection region between the electrode terminals and the bus bar or the wire, a connection region between the cable and a tap terminal, to which the cable is connected, or a connection region at the middle part of the cable.

Specifically, the connection between the electrode terminals and the bus bar is accomplished by welding, soldering, or screw engagement. Consequently, the length of the connecting member may be restricted to a predetermined level such that stress is applied to the connecting member between the electrode terminals and the bus bar, when the unit cells swell, and therefore, the disconnection of the connecting member is accomplished, or the coupling region may be constructed such that the coupling region is cut in one direction.

Preferably, the cable and the tap terminal may be constructed such that the cable and the tap terminal can be detachably coupled with each other. The cable may be connected to the coupling-type tap terminal in the direction in which the cable extends along the thickness of at least one of the unit cells such that the cable can directly correspond to the change of the thickness of the unit cells.

Generally, the cable is manufactured such that the cable has a high tensile force, and therefore, the cable is not cut or broken when a significant external force is applied to the cable. Consequently, in order to cut the cable, the coupling member, which can be separated and coupled, is disposed at the middle part of the cable, and the cable is arranged such that the cable can extends along the thickness of at least one unit cell.

Preferably, when the electrical connecting member, which causes the disconnection, is located at one of opposite ends (a, b) of the battery cells (the unit cells), i.e., one end (a) of the unit cells, the other end (b) of the unit cells is fixed, whereby the thickness of the unit cells is increased at the end (a) of the unit cells, and therefore, the disconnection of the electrically connecting member is easily accomplished.

In the above-described battery pack structure according to the preferred embodiment, the coupling region between the upper case or the lower case and the third circuit unit PCB is physically changed when the battery cells swell, and at least one cable, which serves as the electrically connecting member, is connected to the third circuit unit PCB via the upper case or the lower case such that the disconnection of the at least one cable is mechanically accomplished due to the physical change of the coupling region. For example, when the coupling region at which the upper case and the third circuit unit PCB are coupled with each other is the region physically changed due to the swelling of the battery cells, the upper case is separated from the third circuit unit PCB when the battery cells swell, since the cable is connected to the third circuit unit PCB via the upper case. At this time, an upward tensile force is applied to the cable, and therefore, the cable is mechanically disconnected from the third circuit unit PCB.

In a preferred embodiment, the tap terminal on the third circuit unit PCB, which is connected to one end of the cable, protrudes in the direction in which a tensile force is applied, whereby the tap terminal is easily separated from the tap terminal, and therefore, the disconnection is accomplished.

In the battery pack according to the present invention, the battery cells, which serve as the unit cells, are not particularly restricted so long as the battery cells are secondary cells that can be charged and discharged. Preferably, the battery cells may be rectangular secondary cells or pouch-shaped secondary cells. More preferably, the pouch-shaped secondary cells may be used as the battery cells because the manufacturing costs of the pouch-shaped secondary cells are low, and the pouch-shaped secondary cells provide low volume and weight to capacity and output ratio, whereby the pouch-shaped secondary cells can be stacked one on another with high density. Consequently, the total size and weight of the battery pack are decreased, and the battery pack provides higher output and capacity than other battery packs having the same specifications.

The cathodes, the anodes, the separators, and the electrolyte, which constitutes the respective battery cells, are well known in the art to which the present invention pertains, and are used in the battery pack according to the present invention. For example, lithium transition metal oxide, such as lithium cobalt oxide, lithium manganese oxide, lithium nickel oxide, and the composition of the oxides may be used as the cathode active material.

The battery cells are electrically connected in series and/or in parallel with each other depending upon desired output and capacity of the battery pack. Also, the battery cells are electrically connected to the main board assembly for controlling the overall operation of the battery pack, and are electrically connected to the FET element for controlling the overcharge and the overdischarge.

When the pouch-shaped secondary cells are used as the unit cells, the thickness of the unit cells can increase up to 10% of the original thickness of the unit cells in the normal state. When the abnormal state continues, however, the unit cells swell more than the maximum level. As a result, degradation of the electrodes occurs, and therefore, a possibility of explosion is accelerated. For this reason, a critical value is set to less than the increment of the thickness at which the possibility of explosion is highly increased, whereby the disconnection of the electrically connecting member is accomplished, and therefore, the safety of the battery pack is guaranteed. When the rectangular secondary cells are used as the unit cells, the volume change of the rectangular secondary cells is less than that of the pouch-shaped secondary cells due to the mechanical properties of the rectangular case thereof. Consequently, the critical value of the change of the thickness of the rectangular secondary cells may be set in consideration of the above-mentioned details.

The battery pack according to the present invention may be used not only as a power source for electric bicycles (E-bikes), electric motorcycles, electric vehicles, or hybrid electric vehicles but also as a power source for various fields and products. Preferably, the battery pack according to the present invention is used as a power source for electric bicycles since the battery pack has a compact structure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
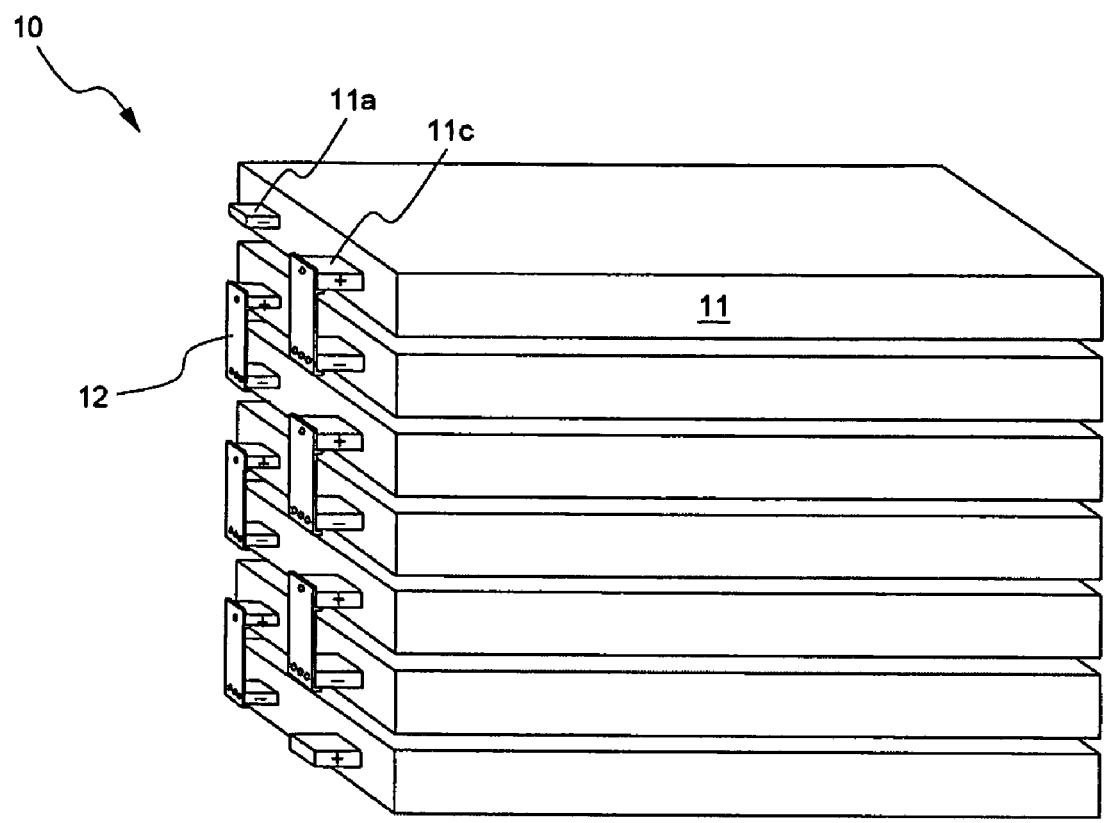
FIG. 1 is a typical view illustrating a battery module, which constitutes a battery pack according to a preferred embodiment of the present invention, the battery module having a structure in which bus bars can be separated from electrode terminals of unit cells.

FIG. 1 is a typical view illustrating a battery module, which constitutes a battery pack according to a preferred embodiment of the present invention, the battery module having a structure in which bus bars can be separated from electrode terminals of unit cells.

Referring to FIG. 1, the battery module 10, which constitutes a middle- or large-sized battery pack, includes a plurality of battery cells 11, which are unit cells stacked one on another such that terminals 11c and 11a of the battery cells 11 are oriented in the same direction. According to circumstances, the battery cells 11 may be stacked one on another such that the terminals 11c and 11a of the battery cells 11 are arranged in a 90-degree or 180-degree orientation manner, the details of which are disclosed in Korean Patent Application No. 2004-92887, which has been filed in the name of the applicant of the present patent application. The disclosure of the above-mentioned Korean patent application is hereby incorporated by reference as if fully set forth herein.

The battery cells 11 may be stacked one on another while the battery cells 11 are in direct contact with each other, or, as shown in FIG. 1, the battery cells 11 may be stacked one on another such that the battery cells 11 are spaced a predetermined distance from each other. Heat is generated from the battery cells 11, which are secondary cells, during the charge and discharge of the battery cells 11. If the heat generated from the battery cells 11 is accumulated, the abnormal operation or degradation of the battery cells 11 is accelerated. For this reason, it is preferable that the battery cells be spaced apart from each other so as to accomplish effective heat dissipation. This heat dissipation-type stacking structure may be provided, for example, by interposing specific media between the battery cells 11 or mounting the respective battery cells 11 or partially combined unit cells 11 into additional cartridges and then stacking the cartridges one on another.

The terminals 11c and 11a are connected in series with each other by bus bars 12. The terminals 11c and 11a and the bus bars 12 are coupled with each other by laser welding, spot welding, soldering, or screw engagement.

The battery cells 11 may swell due to degradation of the battery cells 11 caused by the abnormal operation of some or all of the battery cells 11 or continuous charge and discharge of the battery cells 11.

Figure 2:
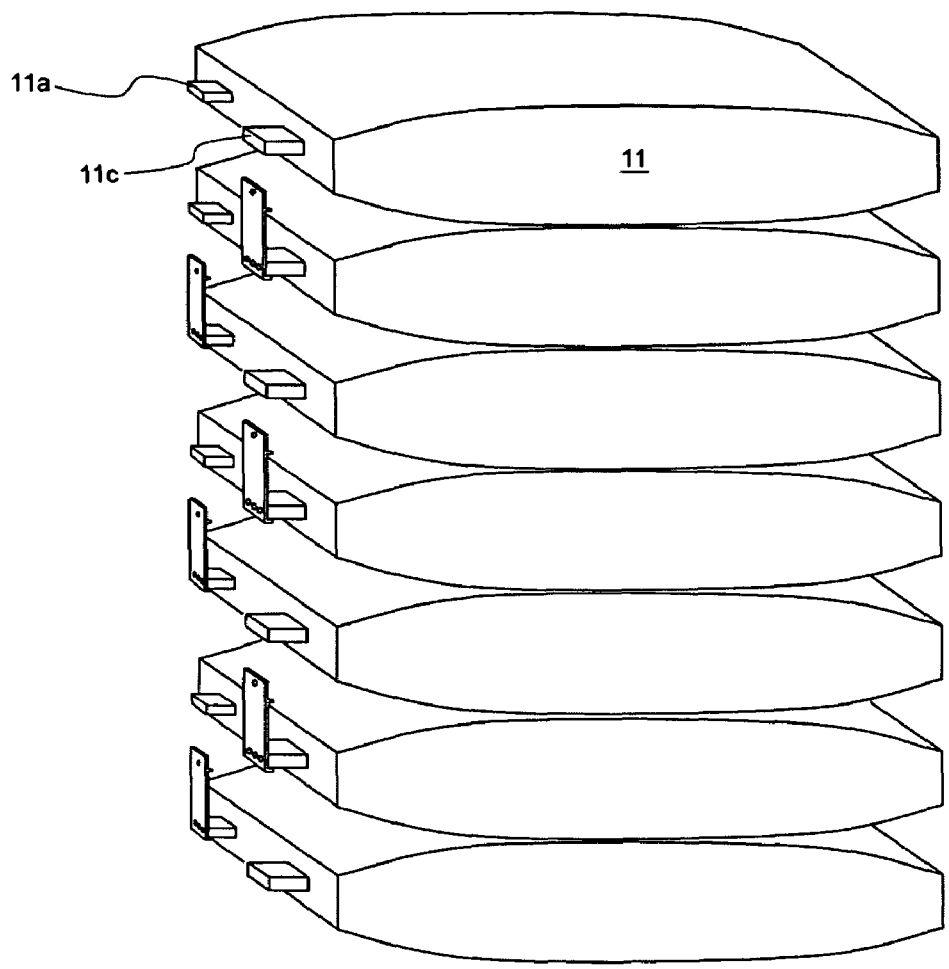
FIG. 2 is a typical view illustrating the swelling of all the unit cells in the battery module shown in FIG. 1.

FIG. 2 is a typical view illustrating the swelling of all the unit cells constituting the battery module. For convenience of clear understanding, the swelling of the unit cells is somewhat exaggerated.

When the battery cells 11 swell due to various causes, as shown in FIG. 2, specifically, the battery bodies swell, the distance between the electrode terminals 11c and 11a of one battery cell 11 and the electrode terminals 11c and 11a of the neighboring battery cell 11 is increased. According to the present invention, when the volumes of the battery cells 11 are increased due to the physical change of the battery cells 11 as described above, the bus bars 12, which serve as electrically connecting members, are physically disconnected from the corresponding battery cells 11 without difficulty.

Figure 3:
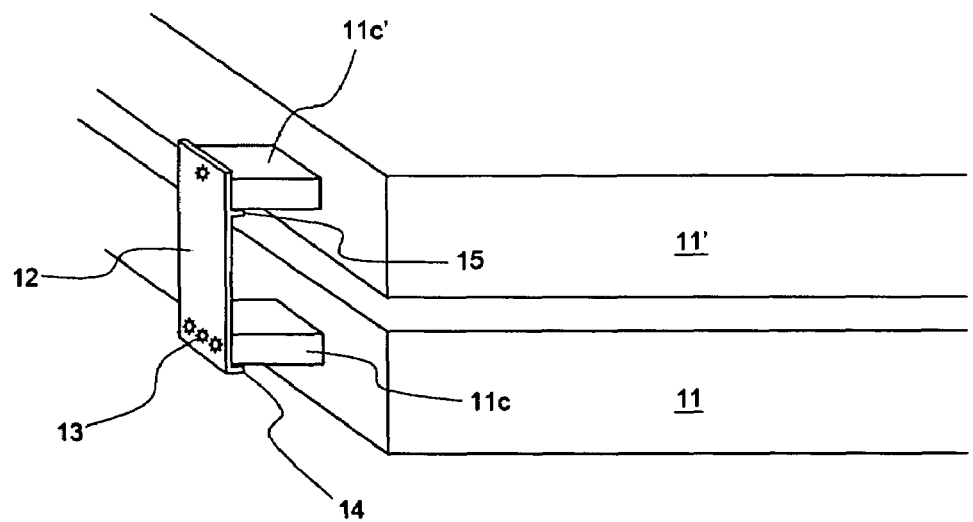
FIGS. 3 and 4 are typical views, in part, illustrating the connection relations between the electrode terminals and the corresponding bus bar in the state that the unit cells are normally connected with each other and in the state that the unit cells are disconnected from each other due to the swelling of the unit cells in the battery module shown in FIG. 1, respectively.
Figure 4:
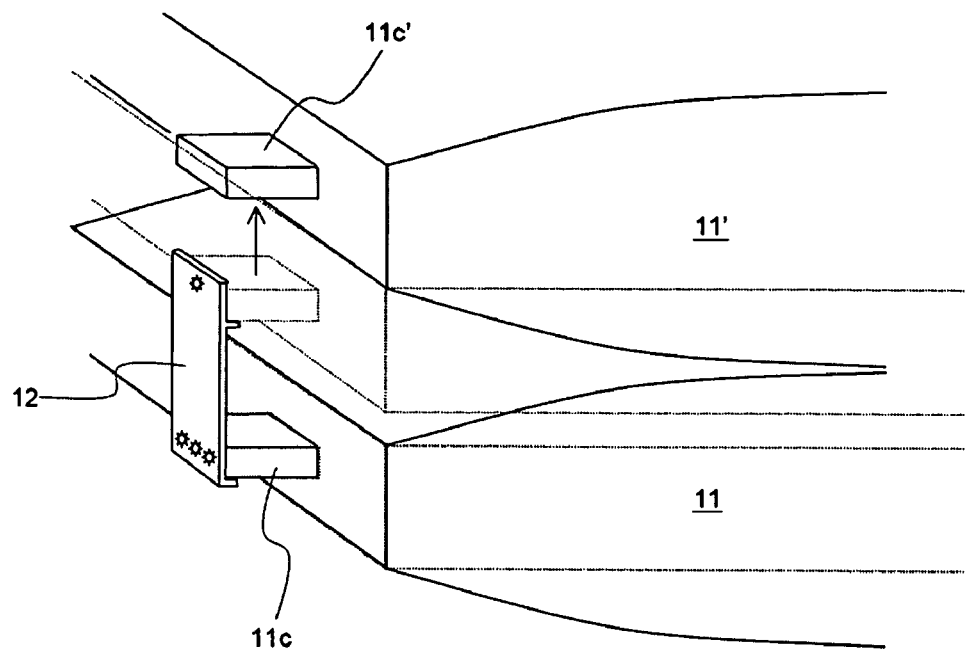

FIGS. 3 and 4 are typical views illustrating the connection relations between the electrode terminals and the corresponding bus bar in the state that the unit cells are normally connected with each other and in the state that the unit cells are disconnected from each other due to the swelling of the unit cells in the battery module, respectively.

Referring to these drawings, the bus bar 12 is a plate-shaped conductive member, which is fixed to the electrode terminals 11c and 11c' of the battery cells 11 and 11' by spot welding. The electrode terminal 11c has more welding points than the electrode terminal 11c', and therefore, the bus bar 12 has a higher coupling force with respect to the electrode terminal 11c than the electrode terminal 11c'.

Also, a latching protrusion 14 is formed at the lower end of the bus bar 12 such that the latching protrusion 14 extends in the longitudinal direction of the electrode terminal 11c. The latching protrusion 14 serves to assist the bus bar 12 to be properly positioned on the electrode terminal 11c. Furthermore, the latching protrusion 14 serves to maintain the coupling between the electrode terminal 11c and the bus bar 12 and to assist the electrode terminal 11c' and the bus bar 12 to be easily separated from each other when the battery cells 11 and 11' swell. According to circumstances, another latching protrusion 15 may be formed at a predetermined position of the bus bar 12 such that the latching protrusion 15 extends in the longitudinal direction of the electrode terminal 11c' while being in contact with the lower surface of the electrode terminal 11c'.

Referring back to FIG. 1, since the bus bars 12, which serve as the electrically connecting members of the battery pack, are separated from the battery cells 11 when the battery cells 11 swell, when the lower ends of the battery cells 11, which are opposite to the electrode terminals 11c and 11a, are fixed, the volume change of the battery cells 11 is concentrated on the battery cells 11 at the electrode terminal 11c and 11a sides. Consequently, the bus bars 12 can be easily separated from the electrode terminals 11c and 11a.

Figure 5:
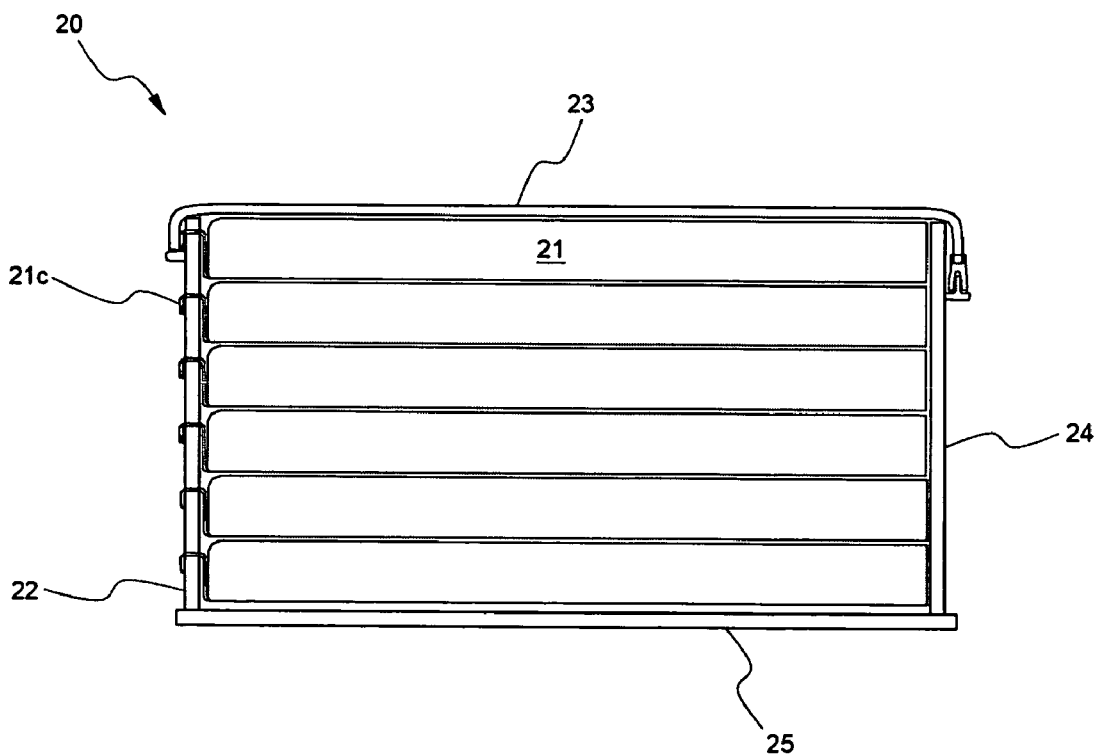
FIG. 5 is a typical view illustrating a battery module, which constitutes a battery pack according to another preferred embodiment of the present invention, the battery module having a structure in which a cable can be separated from a terminal tap.

FIG. 5 is a typical view illustrating a battery module, which constitutes a battery pack according to another preferred embodiment of the present invention, the battery module having a structure in which a cable can be separated from a terminal tap.

Referring to FIG. 5, a plurality of battery cells 21 of a battery module 20 are stacked one on another with high density such that electrode terminals 21c of the battery cells 21 are connected to a connecting board 22. For example, the connecting board 22 is a printed circuit board (PCB). The connecting board 22 serves to electrically and physically connect the battery cells 21 with each other. Also, the connecting board 22 serves to detect the voltage and temperature of the respective battery cells 21. Electric current from the connecting board 22 is transmitted to another PCB 24, which is disposed at the rear of the battery cells 21, via a cable 23. The rear PCB 27 may be a main board that controls the overall operation of the battery pack or a safety board having a field effect transistor (FET) element mounted thereon. According to circumstances, the rear PCB 27 may include external input and output terminals.

Figure 6:
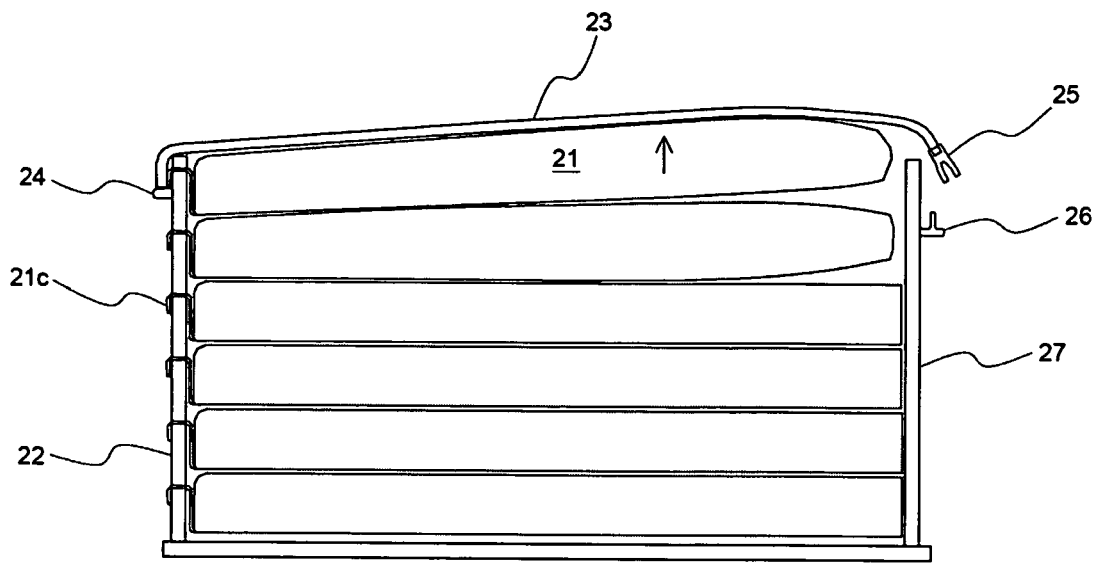
FIG. 6 is a typical view illustrating the swelling of some unit cells in the battery module shown in FIG. 5.

The connecting board 22 and the rear PCB 27 are fixed to a lower case 25, and the cable 23 is arranged such that the cable 23 extends along the outer surface of the stacked battery cells 21. Consequently, as shown in FIG. 6, a tensile force is applied upward when the battery cells 21 swell. Although FIG. 6 typically illustrates the swelling of some of the battery cells 21, the upward tensile force is applied to the cable 23 even when all the battery cells 21 swell. Since the electrode terminals 21c of the battery cells 21 are mechanically connected to the connecting board 22, the swelling of the battery cells 21 is concentrated on the battery cells 21.

One end 24 of the cable 23 is fixedly coupled to the connecting board 22; however, the other end 25 of the cable 23 is detachably coupled to a terminal tap 26 of the rear PCB 27. Especially, the terminal tap 26, to which the cable end 25 is coupled, has an upward protruding coupling structure. Consequently, the terminal tap 26 is separated from the cable end 25 when the upward tensile force is applied to the cable. The critical conditions of the swelling of the battery cells 21 in which the cable end 25 and the terminal tap 26 are separated from each other are decided mainly by the length ratio of the cable 23 to the respective battery cells 21 and the coupling force between the cable end 25 and the terminal tap 26. Consequently, the critical condition for disconnection of the cable 23, which serves as the electrically connecting member, can be decided by appropriately establishing the critical conditions.

Figure 7:
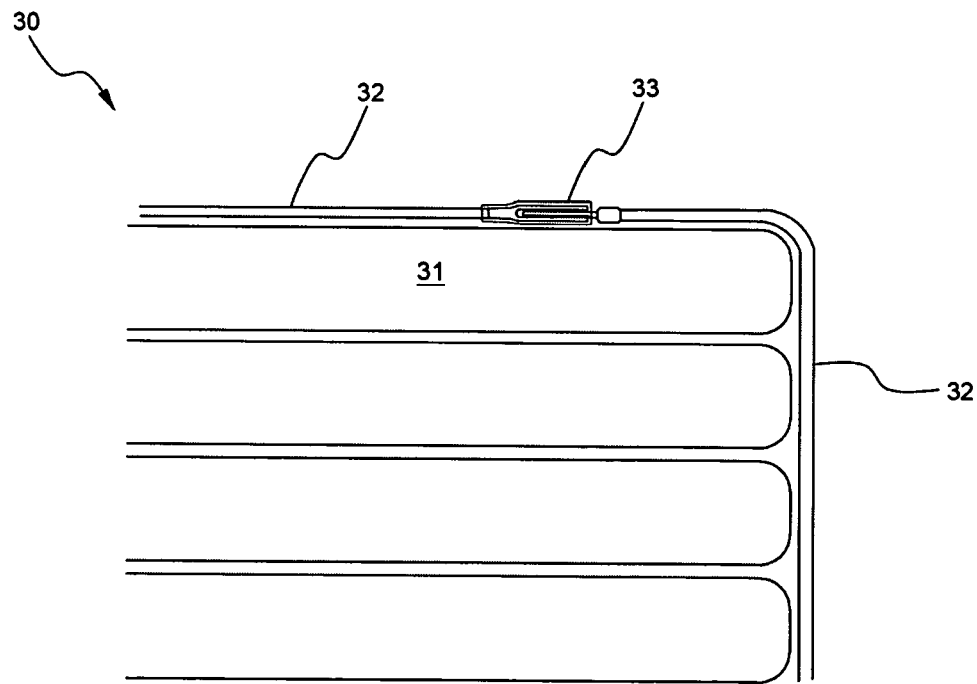
FIG. 7 is a typical view, in part, illustrating a battery module, which constitutes a battery pack according to yet another preferred embodiment of the present invention, the battery module having a structure in which opposite ends of a cable can be separated from each other.

FIG. 7 is a typical view, in part, illustrating a battery module, which constitutes a battery pack according to yet another preferred embodiment of the present invention, the battery module having a structure in which opposite ends of a broken cable can be separated from each other.

Referring to FIG. 7, the battery module 30 is constructed in a structure in which a coupling member 33 is disposed at the middle part of a cable 32, which is arranged such that the cable 32 extends along the outer surface of the stacked battery cells 31.

The cable 32 is arranged such that the cable 32 simultaneously extends along the upper and lower surfaces of the stacked battery cells 32. Consequently, a tensile force is applied to the cable 32 when the volumes of the battery cells are changed. Since the lateral length (thickness) of the battery cells 31 is greatly increased when the battery cells 31 swell, an upward tensile force is mainly applied to the cable 32.

Figure 8:
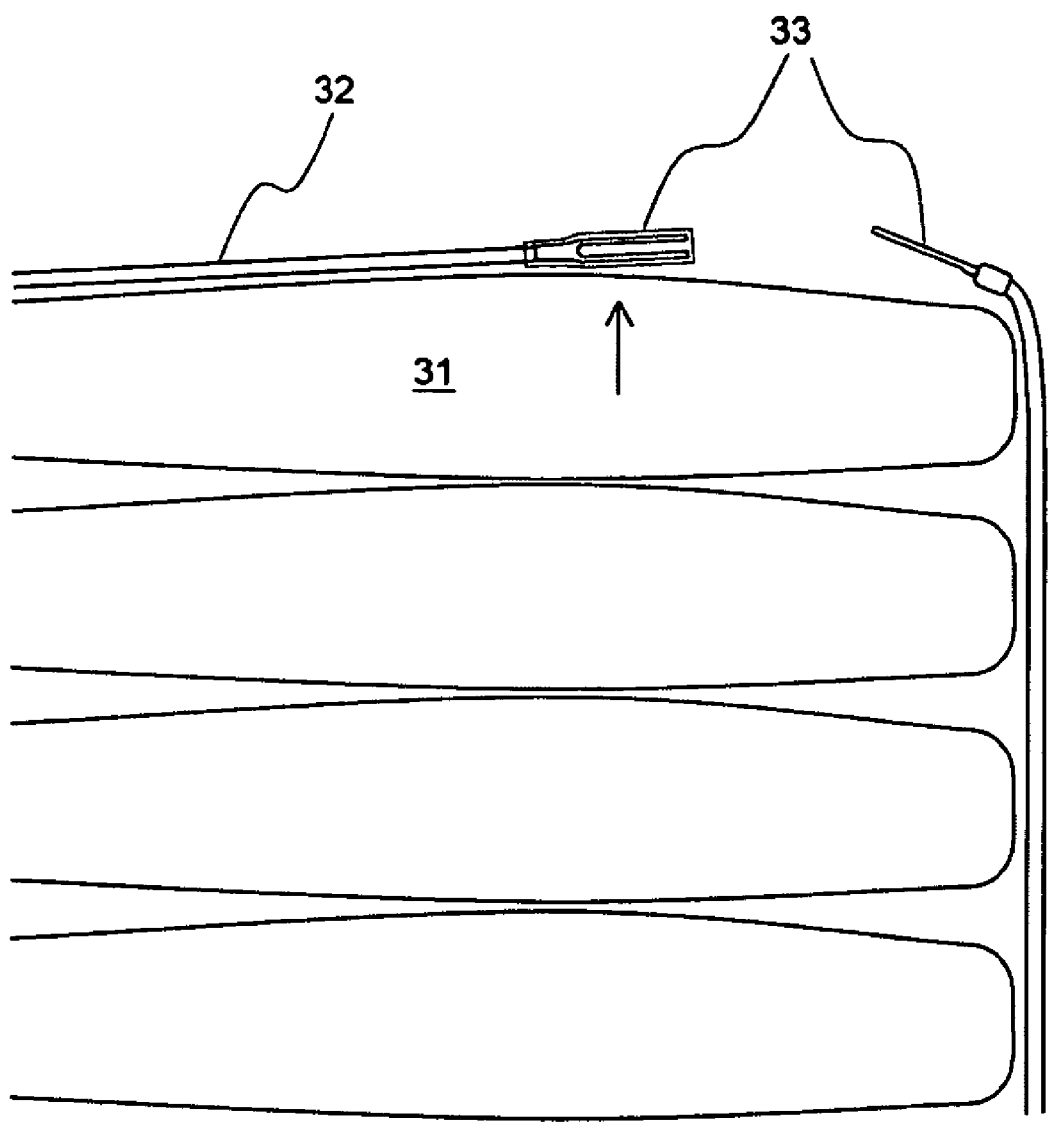
FIG. 8 is a typical view, in part, illustrating the swelling of unit cells in the battery module shown in FIG. 7.

The coupling member 33 disposed at the middle part of the cable 32 is constructed such that opposite ends of the cable 32 can be easily coupled by the coupling member 33 and also be disconnected from each other. To the outer surface of the coupling member 33 is applied an insulating member. Consequently, when the battery cells 31 swell, as shown in FIG. 8, the opposite ends of the cable 32 are separated from each other. Since the opposite ends of the cable 32 placed in the coupling member 33 have a predetermined contact length, the opposite ends of the cable 32 are disconnected from each other only when the battery cells 31 swell more than a predetermined level. Consequently, the swelling degree of the battery cells 31 at which the opposite ends of the cable 32 are disconnected from each other is decided based upon the structure of the coupling member 33.

As shown in FIGS. 7 and 8, the coupling member 33 is formed on the cable 32 placed at the upper surface of the stacked battery cells 31. According to circumstances, however, the coupling member 33 may be placed at the lower surface of the stacked battery cells 31. In the latter case, when the placement direction of the electrode terminals of the battery cells 31 is fixed as shown in FIG. 6, the swelling of the battery cells 31 is concentrated on the lower surface of the stacked battery cells 31, and therefore, the opposite ends of the cable 32 placed in the coupling member 33 are easily disconnected from each other.

FIGS. 9 to 13 are a side view, a rear view, a plan view, a bottom view, and a perspective view illustrating a compact battery pack according to a preferred embodiment of the present invention, respectively. Referring to these drawings, the battery pack 100 includes an upper case 200, a lower case 300, a plurality of unit cells 400, a first circuit unit PCB 500, a second circuit unit PCB 600, and a third circuit unit PCB 700. The unit cells 400 are stacked one on another between the upper case 200 and the lower case 300, which are separated from each other. The first circuit unit PCB 500 is located at the front of the battery pack 100, the second circuit unit PCB 600 is located at the bottom of the battery pack 100, and the third circuit unit PCB 700 is located at the rear of the battery pack 100.

Since the upper case 200 and the lower case 300 are separated from each other, the number of the unit cells 400, which are stackable one on another, is not limited by the upper case 200 and the lower case 300. Consequently, it is possible to easily design the battery module 100, such that the battery module 100 has desired electrical capacity and output, by modifying the first circuit unit PCB 500 and the third circuit unit PCB 700 depending upon the number of the stacked unit cells 400. Also, the unit cells 400 are exposed, and therefore, heat dissipation is efficiently accomplished while the unit cells 400 are charged or discharged.

The lower case 300 is a structure almost corresponding to the outer appearance of the unit cells 400. The lower case 300 includes an upper receiving part (not shown), in which the unit cells 400 are received. The lower case 300 is a member having high strength and electrical insulation. Preferably, the lower case 300 is made of a plastic resin, such as acrylonitrile-butadiene-styrene (ABS), polycarbonate (PC), or polybutylene terephthalate (PBT).

The electrode terminals of the pouch-shaped secondary cells 400 stacked on the lower case 300 are connected to the first circuit unit PCB 500. Specifically, the first circuit unit PCB 500 serves to mechanically connect the secondary cells 400 with each other and to electrically connect the secondary cells 400 with each other.

The secondary cells 400 electrically connected to the first circuit unit PCB 500 are also electrically connected to the third circuit unit PCB 700, at which final input and output terminals are located, via two cables 510 and 520. One of the cables 510 and 520 is a cathode cable, and the other cable is an anode cable. One of the cables 510 is connected to the third circuit unit PCB 700 via the lower end surface of the lower case 300, and the other cable 520 is connected to the third circuit unit PCB 700 via the upper end surface of the upper case 200.

In addition to the cable 510, wires 610 and 612 for electrically connecting the second circuit unit PCB 600 to the first circuit unit PCB 500 and the third circuit unit PCB 700 so as to control the battery pack 100 are arranged at the lower end surface of the lower case 300 having the second circuit unit PCB 600 mounted in a lower receiving part 310 thereof.

On the other hand, the upper case 200 has a lower receiving part (not shown), which corresponds to the size of the unit cells 400 such that the upper part of the stacked unit cells 400 is received in the lower receiving part. The unit cells 400 are mechanically connected to the upper case 200 and the lower case 300 by fasteners 210, which are inserted through through-holes of the electrode terminals, the details of which are described in the previously mentioned Korean Patent Application No. 2004-112589.

The upper case 200 may be made of an insulating member identical to or different from the lower case 300. Preferably, the upper case 200 is made of the same plastic resin as the lower case 300.

The third circuit unit PCB 700 has a rectangular heat-dissipation structure 710, to which FET elements 720 and 730, which are switching elements, are connected.

The first circuit unit PCB 500 forming the front part of the battery pack 100, the upper case 200, and the lower case 300 are coupled with each other by the long fasteners 210, which are inserted through the electrode terminals of the unit cells 400. Consequently, the mechanical strength at the region where the first circuit unit PCB 500, the upper case 200, and the lower case 300 are coupled with each other is high. On the other hand, the third circuit unit PCB 700 forming the rear part of the battery pack 100, the upper case 200, and the lower case 300 are coupled with each other by bolts 800, which are inserted through coupling grooves 740 (coupling grooves of the third circuit unit PCB) formed at the third circuit unit PCB 700, the upper case 200, and the lower case 300, respectively. Consequently, the mechanical strength at the region where the third circuit unit PCB 700, the upper case 200, and the lower case 300 are coupled with each other is low. For this reason, stress generated when the unit cells 400 swell is concentrated on the region where the upper case 200 and/or the lower case 300 and the third circuit unit PCB 700 are coupled with each other. As a result, the region where the upper case 200 and/or the lower case 300 and the third circuit unit PCB 700 are coupled with each other may be broken.

Figure 9:
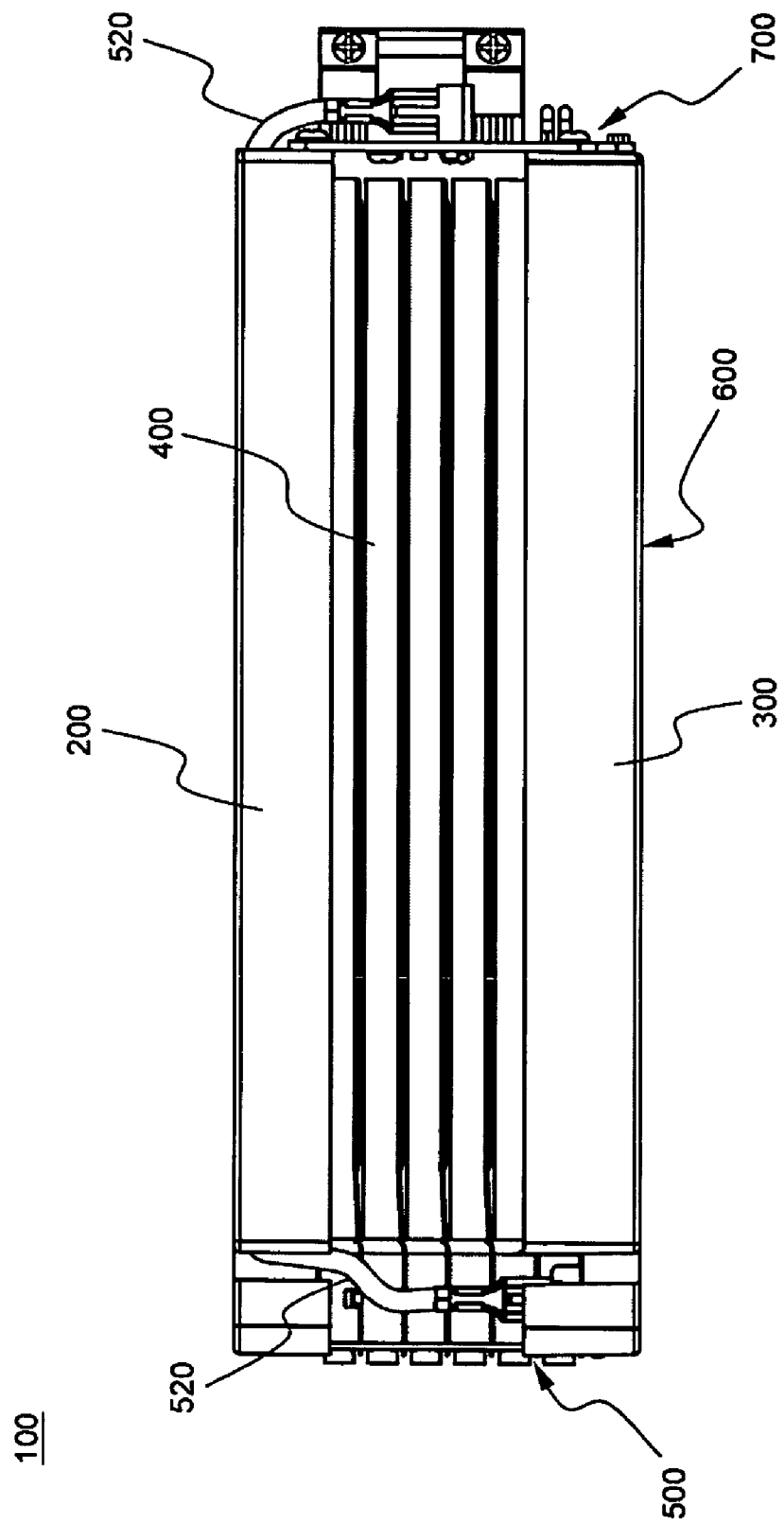
FIGS. 9 to 13 are a side view, a rear view, a plan view, a bottom view, and a bottom perspective view illustrating a compact battery pack according to a preferred embodiment of the present invention, respectively.
Figure 14:
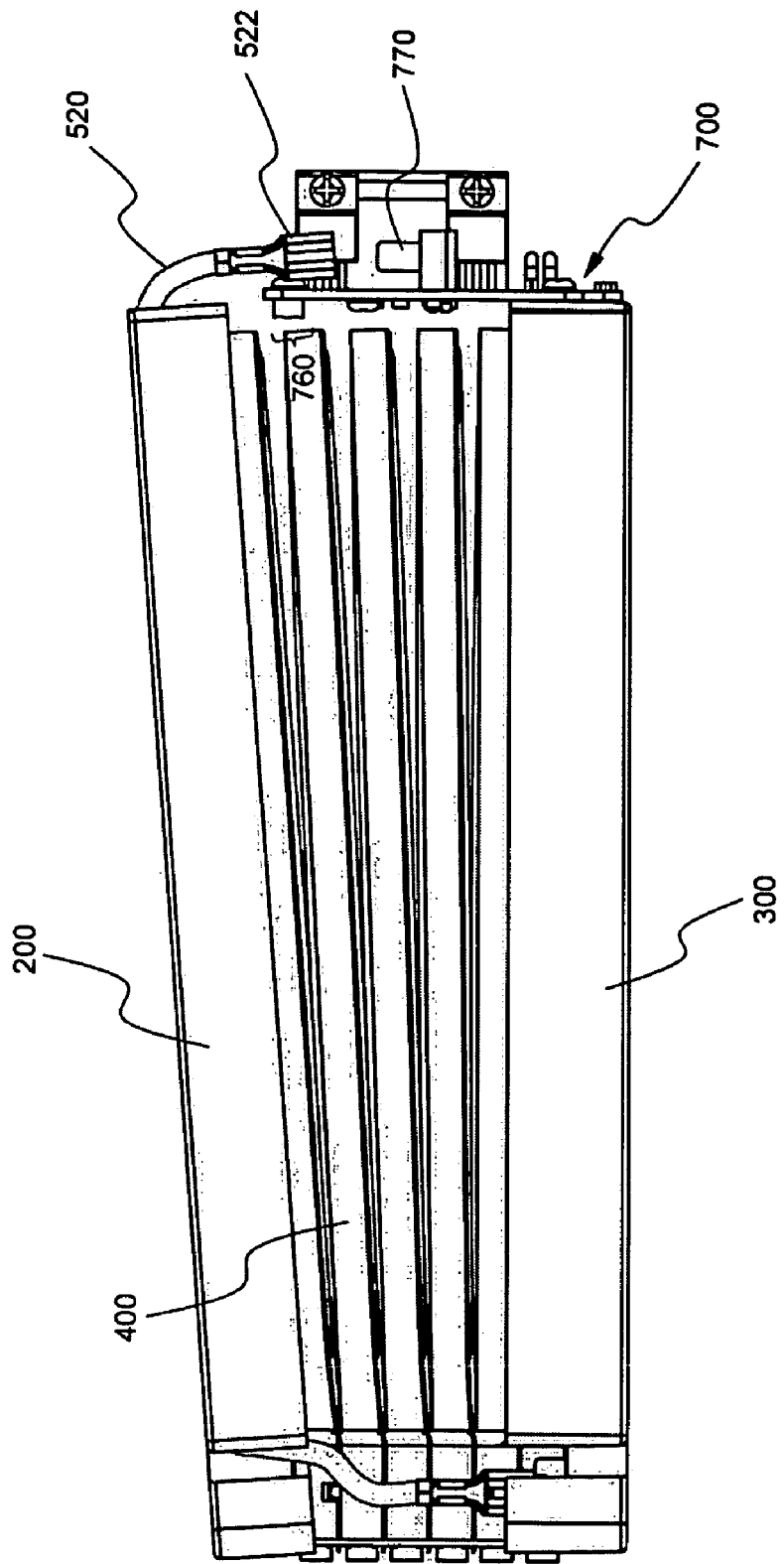
FIG. 14 is a view illustrating the structural change of the battery pack shown in FIG. 9 when unit cells of the battery pack swell.
Figure 15:
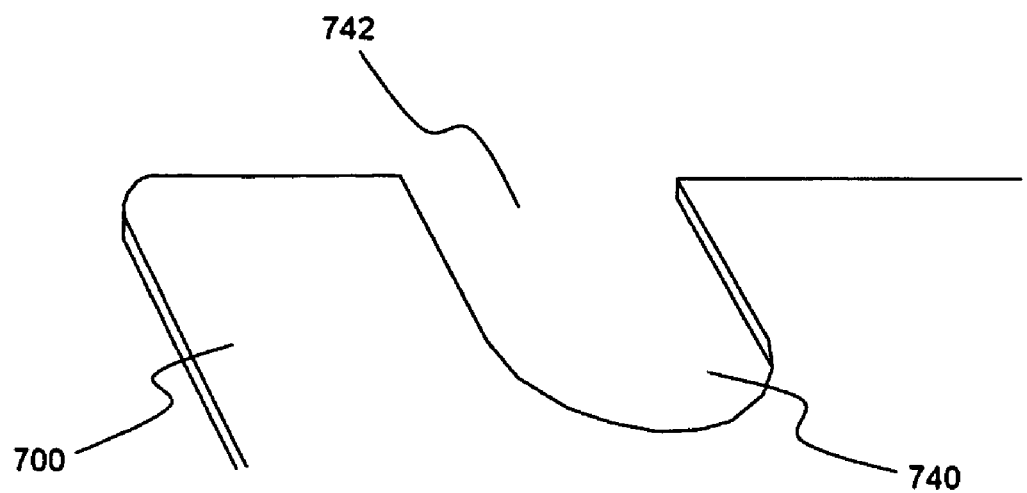
FIGS. 15 to 18 are typical views illustrating coupling grooves having various open structures, which are provided at part A of FIG. 10, and the coupling state of the coupling grooves.
Figure 16:
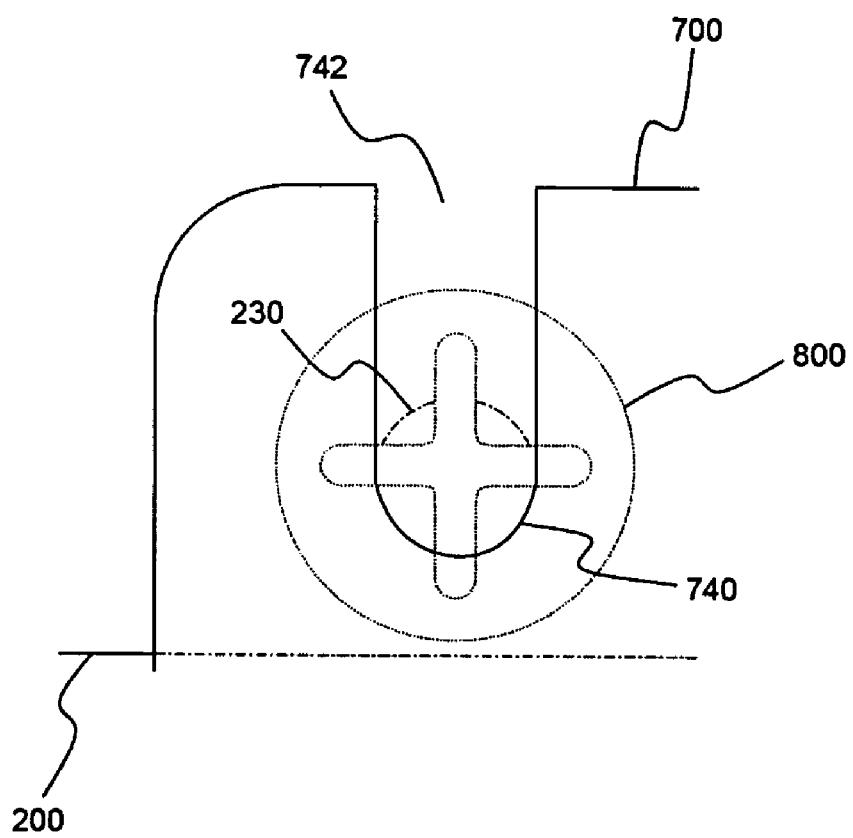
Figure 17:
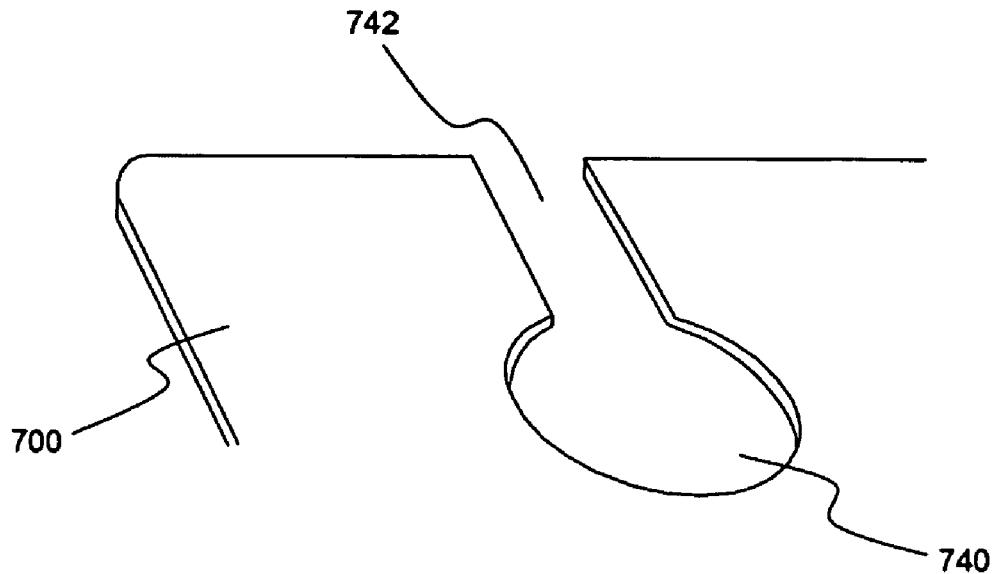
Figure 18:
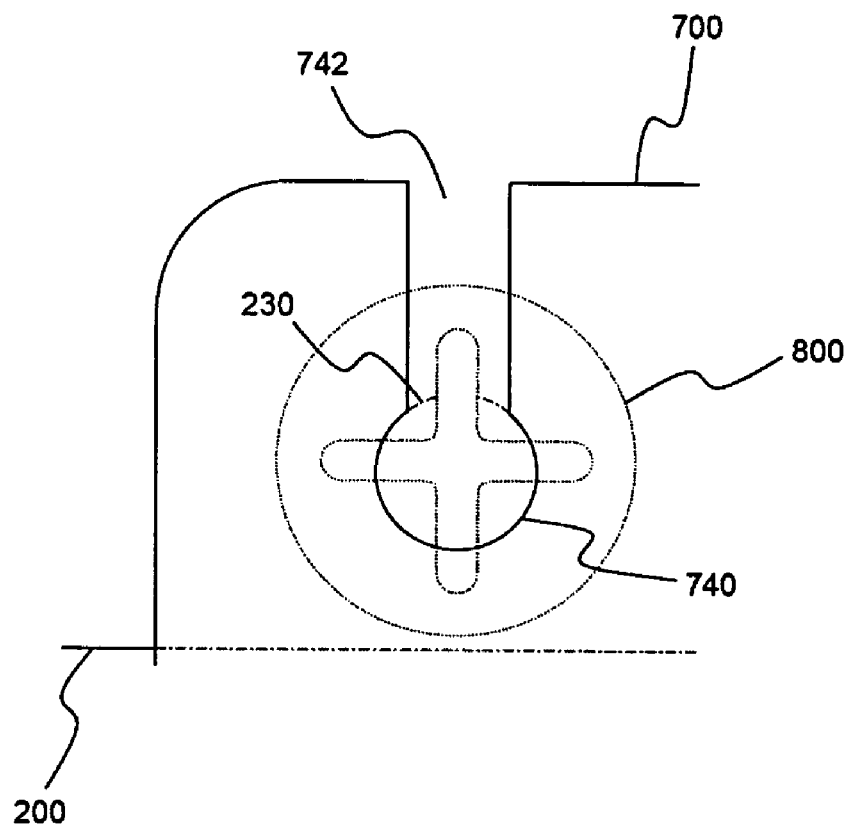

FIG. 14 is a typical view illustrating the structural change of the battery pack 100 shown in FIG. 9 when the unit cells 400 of the battery pack swell.

Referring to FIG. 14, the thickness of the unit cells 400 is increased as the unit cells 400 swell due to various causes. At this time, stress is generated, and a vertical tensile force is applied to the upper case 200 and the lower case 300 by the stress. The stress is concentrated on the weakest region. For example, as shown in FIG. 6, when the region where the third circuit unit PCB 700 and the lower case 300 are coupled with each other is more mechanically stable than the region where the third circuit unit PCB 700 and the upper case 200 are coupled with each other, stress generated from the unit cells 400 causes damage to the coupling region 760. Generally, the PCB is made of an epoxy synthetic resin reinforced with glass fiber. As a result, the PCB has a high mechanical strength. Consequently, as shown in FIG. 6, a portion of the upper case 200 is cut, and therefore, the coupling region 760 is broken.

On the other hand, since the cable 520 connected to the first circuit unit PCB 500 is also connected to the third circuit unit PCB 700 via the upper end surface of the upper case 200, the cable 520 is greatly affected by the change between the upper case 200 and the third circuit unit PCB 700. Specifically, as shown in FIG. 6, when the upper case 200 is separated from the third circuit unit PCB 700, a strong tensile force is applied to the cable 500. As a result, the electrical disconnection between the cable 520 and the third circuit unit PCB 700 is accomplished.

Especially, a terminal tap 770 of the third circuit unit PCB 700 protrudes upward, and one end 522 of the cable 520 is detachably coupled to the terminal tap 770. Consequently, when the upper case 200 is separated from the third circuit unit PCB 700, the electrical disconnection is easily accomplished.

Figure 10:
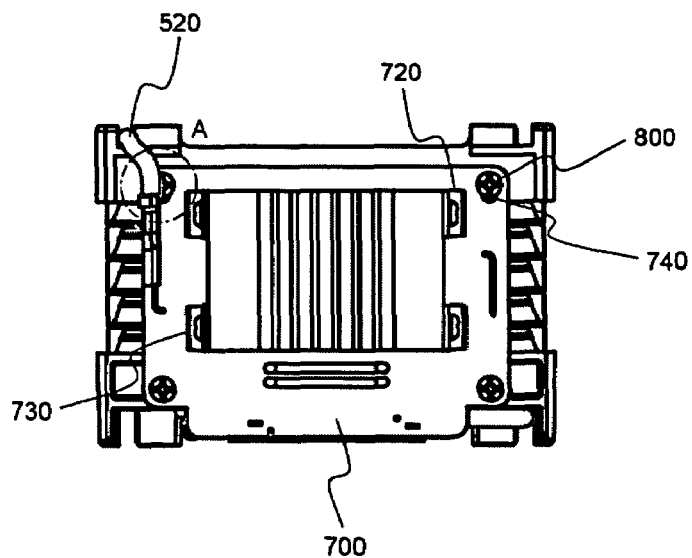
Figure 11:
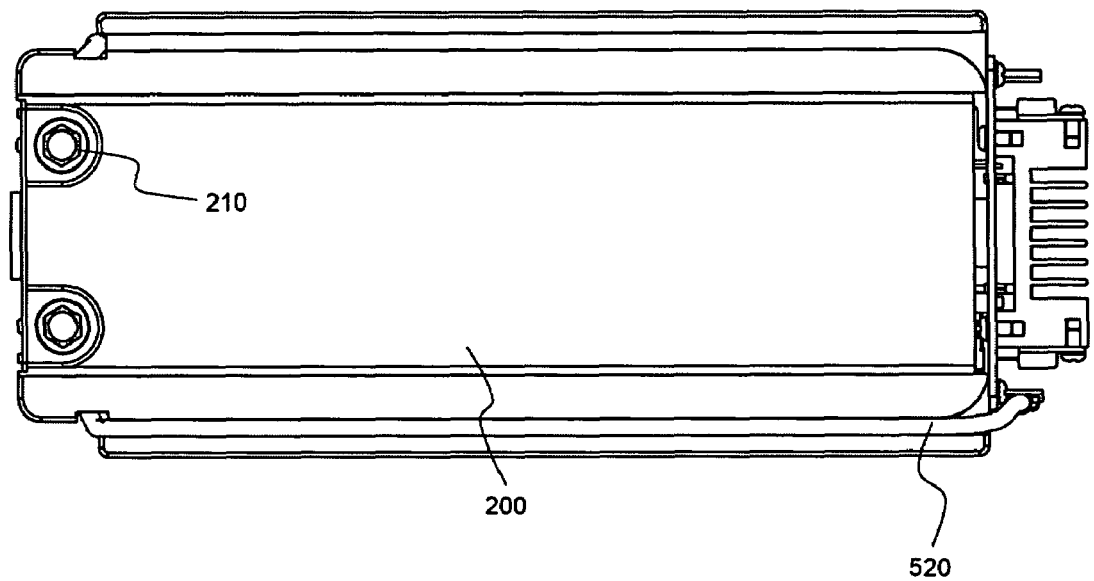
Figure 12:
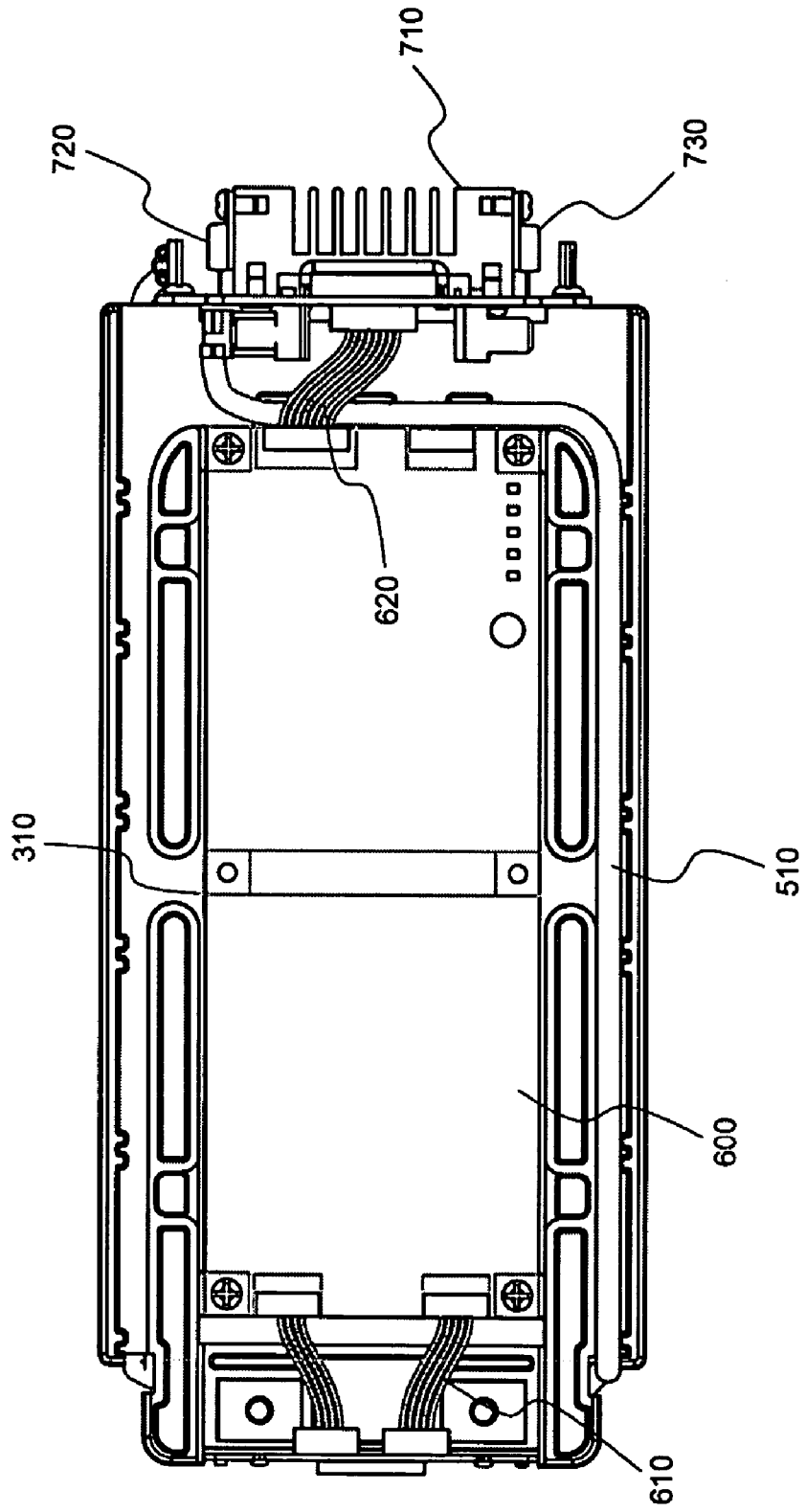
Figure 13:
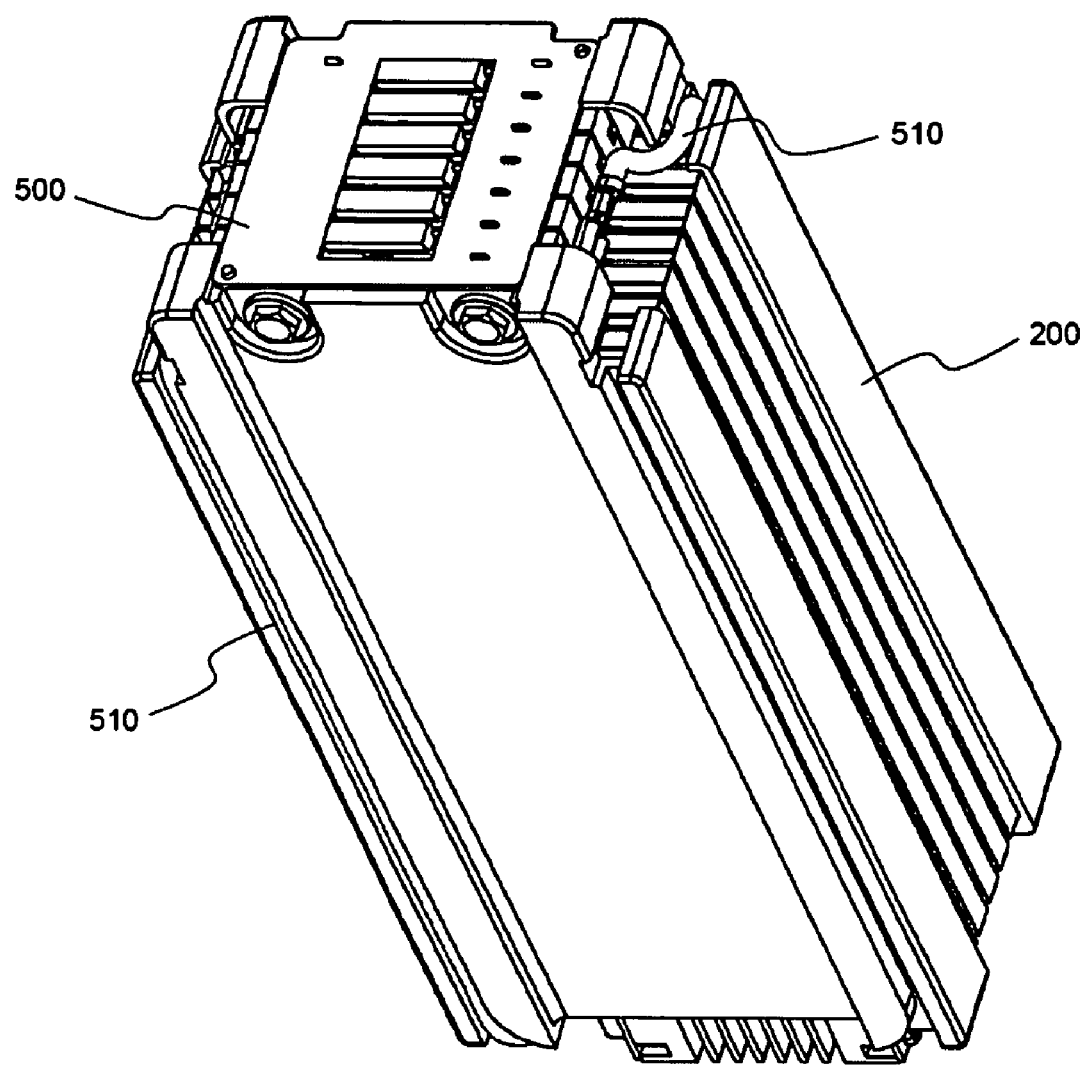

FIGS. 15 to 18 are typical views illustrating coupling grooves having various open structures, which are provided at part A of FIG. 10, and the coupling state of the coupling grooves.

Referring to these drawings, the coupling groove 230 of the upper case 200 is constructed in a closed-type structure, and, on the other hand, the coupling groove 740 of the third circuit unit PCB 700 is constructed in an upward open-type structure. The coupling between the upper case 200 and the third circuit unit PCB 700 is accomplished by aligning the coupling groove 230 of the upper case 200 with the coupling groove 740 of the third circuit unit PCB 700 and inserting a bolt 800 through the aligned coupling grooves 230 and 740. Consequently, when the upper case 200 is moved upward due to the swelling of the unit cells, the bolt 800 moves upward along an opening 742 of the coupling groove 740 of the third circuit unit PCB 700 while the bolt 800 is coupled with the coupling groove 230 of the upper case 200. As a result, the coupling is released. Alternatively, the opening may be formed at the coupling groove 230 of the upper case 200. In this case, the opening is formed at the coupling groove 230 such that the opening is directed downward.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, when battery cells swell due to abnormal operation of the middle- or large-sized battery pack according to the present invention, such as overcharge, overdischarge, or overcurrent, or due to degradation of the battery components caused by the continuous use of the middle- or large-sized battery pack, stress is concentrated on a specific region of the battery pack, and therefore, the electrical connection is released. Consequently, the middle- or large-sized battery pack according to the present invention provides high safety. Also, the battery pack according to the present invention is constructed in a compact and mechanically stable structure, and therefore, a small-sized and light battery pack can be manufactured according to the present invention.

Especially, the swelling of the battery cells due to degradation of the battery cells cannot be controlled by the conventional safety system. This swelling of the battery cells can be controlled only by the battery pack having the above-described structure according to the present invention.

What is claimed is:

1. A middle- or large-sized battery pack having a plurality of battery cells, which can be charged and discharged, stacked one on another with high density and electrically connected with each other, wherein the battery pack comprises,
    a lower case having an upper receiving part, in which the plurality of battery cells are successively stacked one on another as unit cells;
    an upper case having a lower receiving part, which covers the upper end of the unit stacked on the lower case;
    a first circuit unit for electrically connecting the stacked unit cells with each other, the first circuit unit having a sensing board assembly for detecting the voltage, the current, and/or the temperature of the battery and being located at the front of the battery pack in the displacement direction of electrode terminals of the unit cells;
    a second circuit unit electrically connected to the first circuit unit, the second circuit unit having a main board assembly for controlling the overall operation of the battery pack and being located in a lower receiving part of the lower case; and
    a third circuit unit electrically connected to the second circuit unit, the third circuit being connected to an external output terminal while preventing overcharge, overdischarge, and/or overcurrent and being located at the rear of the battery pack,
    wherein the upper case and the lower case of the battery pack are separated from each other;
    wherein at least one cable, which serves as the electrically connecting member, is arranged such that the cable extends along the thickness of at least one of the unit cells, whereby a tensile force is directly applied to the cable when the thickness of the battery cells (the unit cells) is changed; and
    wherein, a predetermined region of the cable, which can be disconnected by thickness increase of the battery cells, is located at one end (a) of opposite ends (a, b) of the battery cells,
    when the battery cells swell due to abnormal operation of the battery pack or degradation of the battery pack caused by the charge and discharge of the battery cells for a long period of time, the thickness of the battery cells is increased at the end (a), and stress is concentrated on the predetermined region of the cable, whereby the disconnection of the electrically connecting member is accomplished.

2. The battery pack according to claim 1, wherein the predetermined region of the cable is a connection region between the cable and a tap terminal, to which the cable is connected, or a connection region at the middle part of the cable.

3. The battery pack according to claim 1, wherein the predetermined region of the cable is a coupling region at which the upper case and/or the lower case and the third circuit unit PCB are coupled with each other.

4. The battery pack according to claim 3, wherein the coupling at the coupling region is accomplished by forming coupling grooves at the corresponding members and inserting a bolt through the coupling grooves.

5. The battery pack according to claim 4, wherein the coupling groove of one of the members at the coupling region is formed in the shape of an open groove.

6. The battery pack according to claim 1, wherein
    the coupling region between the upper case or the lower case and the third circuit unit PCB is physically changed when the battery cells swell, and
    the cable is connected to the third circuit unit PCB via the upper case or the lower case such that the disconnection of the cable is mechanically accomplished due to the physical change of the coupling region.

7. The battery pack according to claim 6, wherein the third circuit unit PCB is provided with a tap terminal, which is connected to one end of the at least one cable, the tap terminal protruding in the direction in which a tensile force is applied.

8. The battery pack according to claim 1, wherein the battery pack is used as a power source for electric bicycles (E-bikes), electric motorcycles, electric vehicles, or hybrid electric vehicles.

* * * * *